United States Patent
Sih et al.

(10) Patent No.: US 6,608,858 B1
(45) Date of Patent: Aug. 19, 2003

(54) MULTIPATH DOPPLER ADJUSTED FREQUENCY TRACKING LOOP

(75) Inventors: Gilbert C. Sih, San Diego, CA (US); Avneesh Agrawal, San Jose, CA (US); Mark Roh, San Diego, CA (US); Brian K. Butler, La Jolla, CA (US); Raghu Challa, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 0 days.

(21) Appl. No.: 09/491,349

(22) Filed: Jan. 26, 2000

(51) Int. Cl.[7] .............................................. H04B 1/707
(52) U.S. Cl. ...................................... 375/147; 375/148
(58) Field of Search ........................ 375/148, 130–347, 375/344, 200; 455/132–137

(56) References Cited

U.S. PATENT DOCUMENTS

| | | | | |
|---|---|---|---|---|
| 5,305,349 A | * | 4/1994 | Dent | 375/148 |
| 5,659,573 A | * | 8/1997 | Bruckert et al. | 375/142 |
| 5,881,056 A | * | 3/1999 | Huang et al. | 370/335 |
| 5,999,560 A | * | 12/1999 | Ono | 375/148 |
| 6,128,329 A | * | 10/2000 | Takakusaki | 375/140 |
| 6,272,167 B1 | * | 8/2001 | Ono | 375/144 |
| 6,278,725 B1 | * | 8/2001 | Rouphael et al. | 375/148 |

FOREIGN PATENT DOCUMENTS

| | | |
|---|---|---|
| EP | 0675606 | 10/1994 |
| WO | 0038343 | 6/2000 |

OTHER PUBLICATIONS

International Search Report, mailed Jul. 31, 2001.

* cited by examiner

Primary Examiner—Stephen Chin
Assistant Examiner—Lawrence Williams
(74) Attorney, Agent, or Firm—Philip R. Wadsworth; Charles D. Brown; Nicholas J. Pauley

(57) ABSTRACT

A method and apparatus for frequency tracking is described. The present invention provides a tracking mechanism for removing the effects of error due to frequency offset as well as compensation for frequency error due to doppler in a plurality of multipath signals. Each finger of a RAKE receiver utilizing the present invention will compute a frequency error for that finger. The weighted average of all of these frequency errors is calculated and filtered to provide a control signal for varying the frequency of IF and RF frequency synthesizers, accounting for the common frequency offset seen at each finger. Additionally, each finger is equipped with a rotator for providing frequency adjustment specific to that finger. The frequency of each finger is adjusted through feedback of the frequency error for that finger.

22 Claims, 8 Drawing Sheets

MULTIPATH DOPPLER ADJUSTED FREQUENCY TRACKING LOOP

BACKGROUND OF THE INVENTION

I. Field of the Invention

The present invention relates to communications. More particularly, the present invention relates to a novel and improved method and apparatus for frequency tracking of multipath signals which have been subjected to doppler shifts.

II. Description of the Related Art

Frequency tracking loops are commonly used in direct sequence spread spectrum communication systems such as that described in the IS-95 over the air interface standard and its derivatives such as IS-95-A and ANSI J-STD-008 (referred to hereafter collectively as the IS-95 standard) promulgated by the Telecommunication Industry Association (TIA) and used primarily within cellular telecommunications systems. The IS-95 standard incorporates code division multiple access (CDMA) signal modulation techniques to conduct multiple communications simultaneously over the same RF bandwidth. When combined with comprehensive power control, conducting multiple communications over the same bandwidth increases the total number of calls and other communications that can be conducted in a wireless communication system by, among other things, increasing the frequency reuse in comparison to other wireless telecommunication technologies. The use of CDMA techniques in a multiple access communication system is disclosed in U.S. Pat. No. 4,901,307, entitled "SPREAD SPECTRUM COMMUNICATION SYSTEM USING SATELLITE OR TERRESTRIAL REPEATERS", and U.S. Pat. No. 5,103,459, entitled "SYSTEM AND METHOD FOR GENERATING SIGNAL WAVEFORMS IN A CDMA CELLULAR TELEPHONE SYSTEM", both of which are assigned to the assignee of the present invention and incorporated by reference herein.

FIG. 1 provides a highly simplified illustration of a cellular telephone system configured in accordance with the use of the IS-95 standard. During operation, a set of subscriber units 10a–d conduct wireless communication by establishing one or more RF interfaces with one or more base stations 12a–d using CDMA modulated RF signals. Each RF interface between a base station 12 and a subscriber unit 10 is comprised of a forward link signal transmitted from the base station 12, and a reverse link signal transmitted from the subscriber unit. Using these RF interfaces, a communication with another user is generally conducted by way of mobile telephone switching office (MTSO) 14 and public switch telephone network (PSTN) 16. The links between base stations 12, MTSO 14 and PSTN 16 are usually formed via wire line connections, although the use of additional RF or microwave links is also known.

Each subscriber unit 10 communicates with one or more base stations 12 by utilizing a rake receiver. A RAKE receiver is described in U.S. Pat. No. 5,109,390 entitled "DIVERSITY RECEIVER IN A CDMA CELLULAR TELEPHONE SYSTEM", assigned to the assignee of the present invention and incorporated herein by reference. A rake receiver is typically made up of one or more searchers for locating direct and multipath pilot from neighboring base stations, and two or more fingers for receiving and combining information signals from those base stations. Searchers are described in co-pending U.S. patent application Ser. No. 08/316,177, entitled "MULTIPATH SEARCH PROCESSOR FOR SPREAD SPECTRUM MULTIPLE ACCESS COMMUNICATION SYSTEMS", filed Sep. 30, 1994, assigned to the assignee of the present invention and incorporated herein by reference.

In any passband digital communication system, such as that described above in relation to FIG. 1, there is a need for carrier synchronization. The sender modulates information onto a carrier at frequency $f_c$, and the receiver must recover this frequency so that the received signal constellation does not rotate and degrade the signal to noise ratio (SNR) of the demodulated symbols. In the following discussion, the sender is a CDMA base station and the receiver is a CDMA subscriber unit.

Although the receiver knows the nominal carrier frequency, there are two main sources of error that contribute to the frequency difference between the received carrier from the base station and the carrier produced at the subscriber unit. First, the subscriber unit produces the carrier using a frequency synthesizer that uses a local clock as its timing reference. An example RF/IF section of a conventional heterodyne CDMA receiver is shown in FIG. 2. A signal received at antenna 200 is passed through low-noise amplifier (LNA) 202 and filtered in filter 204 before being mixed down to IF by RF mixer 206. This IF signal is filtered in filter 208, passed through variable-gain amplifier (VGA) 210 and is then mixed down to baseband by IF mixer 212. The baseband signal is then filtered in filter 214 and passed through analog to digital converter 216 to produce IQ symbols at baseband.

The carrier waveforms sent to RF and IF mixers 206 and 208 are produced using frequency synthesizers 218 and 220, respectively, that use the subscriber unit's local clock as a timing reference. This clock has an unknown timing error, typically expressed in parts per million (ppm). In the exemplary implementation, this clock is voltage-controlled temperature compensated crystal oscillator (VCTCXO) 222, whose frequency is 19.68 MHz and is rated at +/−5 ppm. This means if the desired waveform is a cellular 800 MHz carrier, the synthesized carrier applied to the RF mixer can be 800 MHz+/−4000 Hz. Similarly, if the desired waveform is a 1900 MHz PCS carrier, the synthesized carrier can be 1900 MHz+/−9500 Hz. To correct this error, CDMA receivers use a frequency tracking loop that monitors the frequency error and applies a tuning voltage to VCTCXO 222 to correct it.

The second source of error is due to frequency doppler created from movement of the subscriber unit station. The doppler effect manifests as an apparent change in the frequency of a received signal due to a relative velocity between the transmitter and receiver. The doppler contribution can be computed as $$f_D = \frac{v}{\lambda}\cos\theta = \frac{vf}{c}\cos\theta$$

where v is the velocity of the subscriber unit, x is the wavelength of the carrier, f is the carrier frequency, and c is the speed of light. The variable θ represents the direction of travel of the subscriber unit relative to the direction of the received path from the base station. If the subscriber unit is travelling directly toward the base station, θ=0 degrees. If the subscriber unit is travelling directly away from the base station, θ=180 degrees. So the carrier frequency received at the subscriber unit changes depending on the speed and direction of the subscriber unit relative to the received signal path.

As mentioned above, CDMA systems use RAKE receivers that combine symbol energy from different paths. Each strong path is tracked by a finger that performs despreading, walsh decovering and accumulation, pilot time and frequency tracking, and symbol demodulation. An exemplary finger architecture is shown in FIG. 3, where each of N fingers 3A–3N outputs pilot and data symbols obtained for the path it is tracking to digital signal processor (DSP) 300. DSP 300 performs symbol demodulation and implements the time and frequency tracking loops. IQ baseband samples are despread in PN despreaders 310A–310N, and I and Q pilot and data samples are produced in walsh decover and accumulate blocks 320A–320N and 330A–330N, respectively.

An exemplary IS-95A CDMA receiver has four fingers to track four paths, whereas an exemplary cdma2OOO CDMA receiver has 12 fingers to handle the 3x multicarrier case. Cdma2OOO is described in TIA/EIA/IS-2000-2, entitled "PHYSICAL LAYER STANDARD FOR CDMA2000 SPREAD SPECTRUM SYSTEMS", incorporated herein by reference. A subscriber unit can be tracking paths from different base stations (in soft handoff), as well as time-delayed paths from the same base station, created from reflections off of local objects. Since the angle θ can be different for each path that the subscriber unit is tracking, the frequency doppler seen by each finger can be different, as illustrated in FIG. 4, which shows subscriber unit 400 in 3-way soft handoff with base stations 410A–410C. Subscriber unit 400 is traveling at velocity v and receiving signals from a variety of paths labeled Path 1 through Path 4. Path 1 comes from base station 410A at angle $\theta_1$ equal to π. Path 2 comes from base station 410B at angle $\theta_2$. Path 3 comes also comes from base station 410B but reflects off building 420 and arrives with angle $\theta_3$. Path 4 comes from base station 410C and arrives with angle $\theta_4$ equal to 0.

If we assume the subscriber unit has four fingers (labeled finger 1 through finger 4) and that finger i is tracking path i, we can see that the doppler seen by finger 1 is $$-\frac{vf}{c},$$

the doppler seen by finger 2

$$\frac{vf}{c}\cos\theta_2,$$

the doppler seen by finger 3 is $$\frac{vf}{c}\cos\theta_3,$$

and the doppler seen by finger 4 is $$+\frac{vf}{c},$$

where v is the subscriber unit velocity, f is the carrier frequency, c is the speed of light, and $\theta_1$ is the angle of incidence of the path with respect to the direction of subscriber unit 400.

To reduce the frequency error, CDMA receivers typically use a frequency locked loop that can be modeled as shown in FIG. 5. Frequency error detector 500 computes a measure of the difference between the received carrier frequency ω(n) and the synthesized carrier frequency ω(n). This error signal e(n) is filtered in loop filter 510 and fed back as c(n) to a voltage controlled oscillator (VCO) 520 that modifies the frequency of the synthesized carrier ω(n). This closed-feedback loop corrects the carrier error.

We can apply this principle to a CDMA receiver as shown in FIGS. 6A and 6B. IQ baseband samples are passed into N fingers, labeled 600A–600N in FIG. 6B. FIG. 6A details the frequency error discrimination function of finger 600 which produces frequency error measure e(n). This functionality is replicated in fingers 600A–600N to produce frequency error measures $e_1(n)$–$e_N(n)$, respectively. PN despreading and walsh accumulation to demodulate pilot symbols is performed in block 610. The resulting I(n) and Q(n) are delayed in blocks 620 and 630, respectively. The frequency error is measured by computing the phase rotation between successive pilot symbols in phase rotation measure block 640 to produce error measurement e(n).

Referring to FIG. 6B, frequency error measures $e_1(n)$–$e_N(n)$ from fingers 600A–600N are added together in summer 650 and the sum is passed through loop filter 660 with adjustable gain α. The result is sent to the voltage controlled oscillator 680 using pulse-density modulator (PDM) 670. Pulse density modulation is a method, known in the art, of converting a digital signal into an analog control voltage. This method applies a single frequency correction (by changing the local clock frequency) that affects all the fingers. In doing so, it basically neglects the individual doppler frequency error component affecting each finger.

As stated above, the frequency error has a local clock error component that is the same across all fingers, and a doppler component that is different across fingers. The conventional approach just discussed does not address the doppler component. Although the frequency doppler is not a serious problem at low speeds, it can become a problem when travelling at high speeds, such as on a bullet train. For bullet trains travelling at 500 km/hr, the maximum doppler is around 880 Hz, which can severely degrade the demodulated symbols and lead to dropped calls. So, for travelling on fast moving vehicles such as bullet trains, and in any other application where doppler effects on individual paths vary, there is a need for an improved frequency tracking loop in a CDMA receiver that considers the effect of doppler on each finger.

SUMMARY OF THE INVENTION

A novel and improved method and apparatus for frequency tracking is described. Frequency tracking is commonly utilized to provide for synchronization between locally generated carriers in a receiver and the carriers used at the base station to modulate the signals which are received. Two main sources of error that contribute to frequency difference include frequency offset between the two timing sources and doppler effects due to movement of a mobile receiver. In a CDMA system utilizing a RAKE receiver to demodulate multipath signals, each received multipath signal can contain a unique doppler effect as well as a common frequency offset component. The present invention provides a tracking mechanism for removing the effects of error due to frequency offset as well as compensation for frequency error due to doppler in a plurality of multipath signals.

Each finger of a RAKE receiver utilizing the present invention computes a frequency error for that finger. The weighted average of all of these frequency errors is calculated and filtered to provide a control signal for varying the frequency of IF and RF frequency synthesizers. This feature of the invention accounts for the common frequency offset seen at each finger.

Additionally, each finger is equipped with a rotator for providing frequency adjustment specific to that finger. The frequency of each finger is adjusted through feedback of the frequency error for that finger. One embodiment of the invention accomplishes this by subtracting the frequency error component of a finger from the overall weighted average, filtering the remainder, and with that filtered remainder controlling the rotator for that finger. In this way the weighted average of all the errors is used to drive the common frequency synthesis and the difference between the average and the specific error for each finger is used to drive each finger's individual rotator and thus its doppler frequency compensation.

An alternative embodiment uses the independent frequency error for each finger directly by filtering it and using it to drive the rotator for that finger. Thus, the independent frequency errors are used to directly compensate for the doppler on each finger. These frequency errors, now doppler adjusted, are then weighted and averaged, the result of which is filtered and used to drive the frequency synthesizers. This weighted average accommodates the frequency offset component of the frequency error as well as the average of the doppler components of the various fingers. The gains of the individual loop filters can be adjusted in relation to the gain of the loop filter driving the frequency synthesizers so that the tracking speeds of the individual doppler compensation loops is appropriate in relation to the speed of the overall frequency offset tracking loop.

This alternative embodiment can be further refined to provide a system which ensures that the frequency synthesizers are tracking the average frequency error of all the fingers. In the previous embodiments, if the rotator loop compensates for some of the frequency error before its contribution is included in the synthesizer loop, the synthesizer loop may not be tracking the true weighted average. The refinement is to compute a second weighted average of the filtered versions of the individual frequency errors. This second weighted average is then multiplied by a factor and summed with the weighted average calculated as described above. The sum is used to drive the frequency synthesis loop. Therefore, even if the frequency error for a finger is driven to zero, effectively removing that finger's contribution to the weighted average of frequency errors, its filtered frequency error will contribute to the second weighted average, and the synthesizer loop will be driven by it. Thus, the synthesizer loop will be driven according to the true weighted average of the finger frequency errors. Timing based on the average frequency error is a useful feature when used in other parts of a system. For example, a receiver's timing may be useful for timing a transmitter to which it is coupled.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Figure 1:
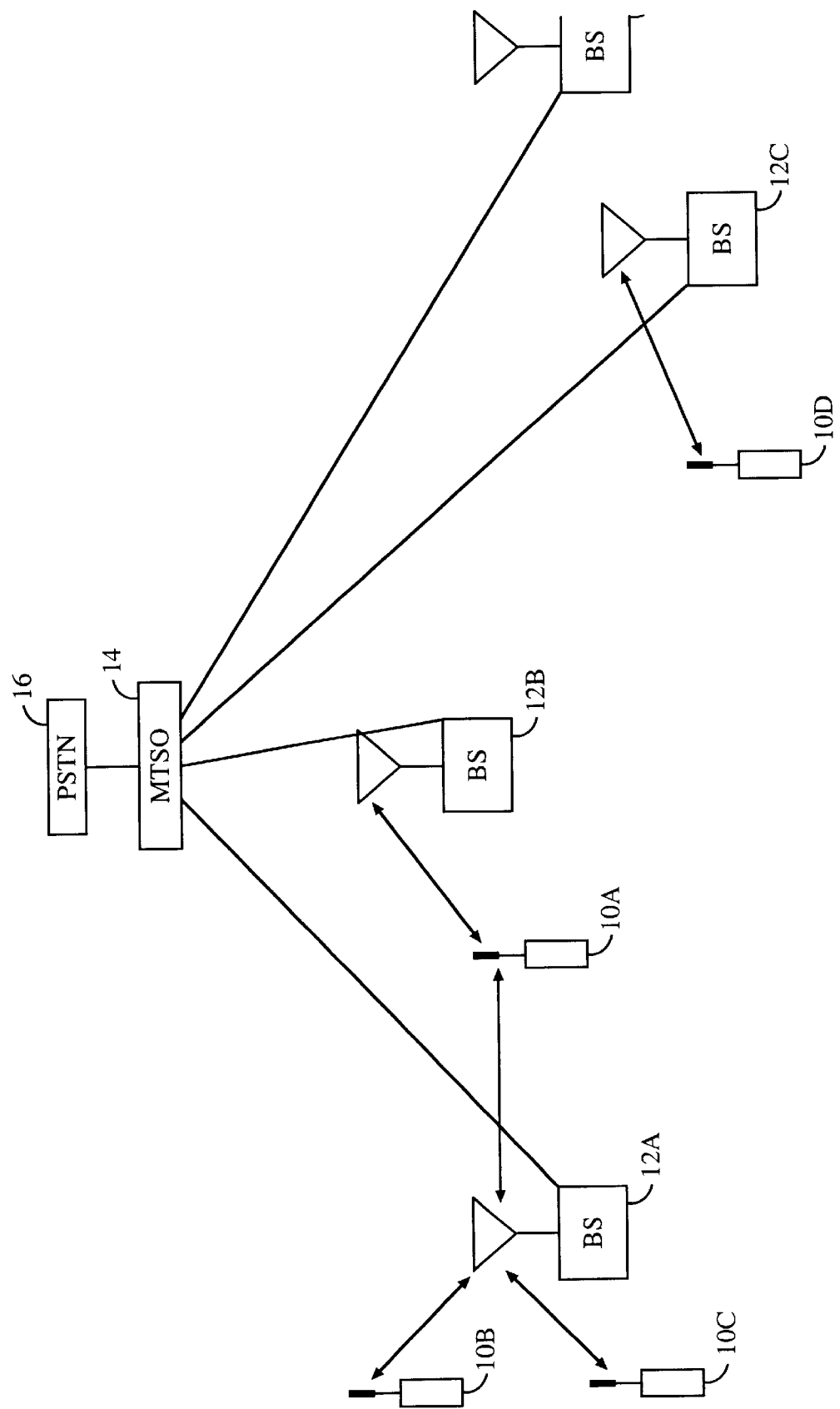
FIG. 1 is a block diagram of cellular telephone system.
Figure 2:
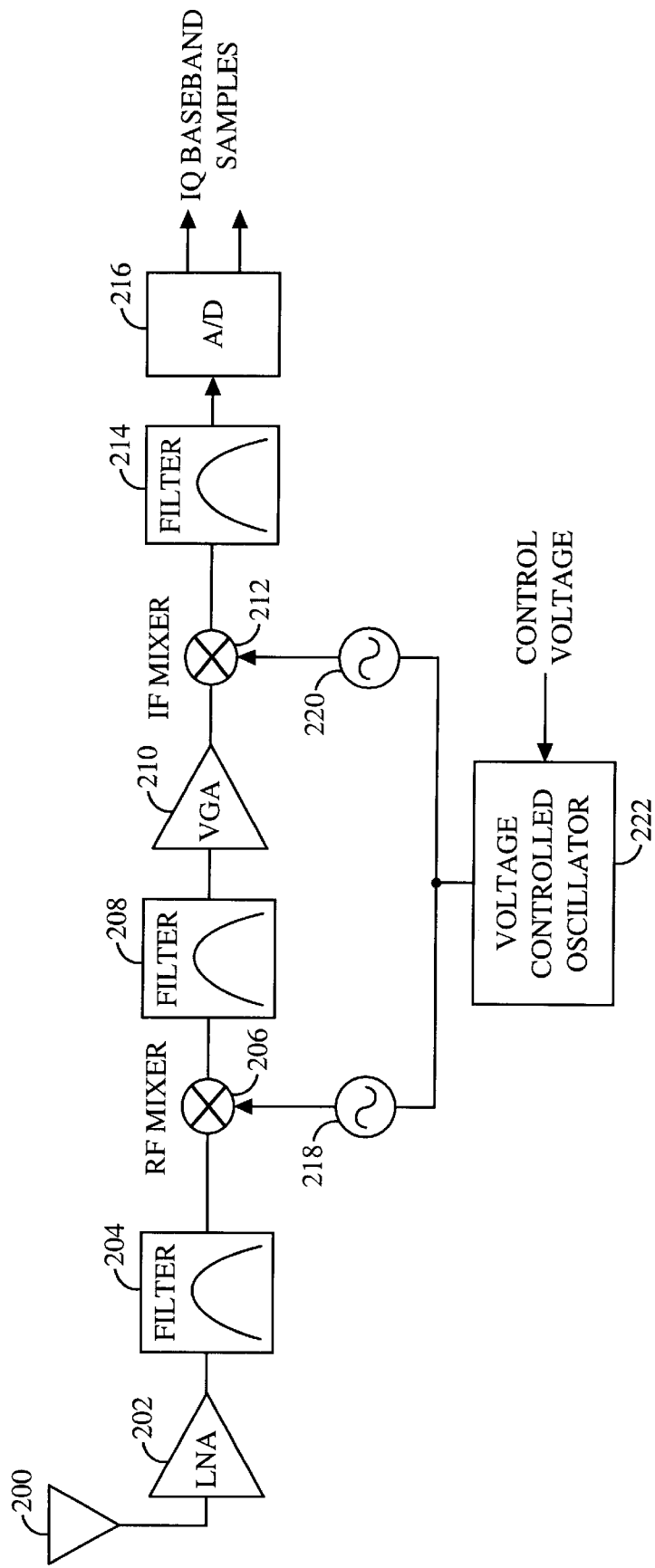
FIG. 2 is a prior art RF/IF section of a conventional heterodyne CDMA receiver.
Figure 3:
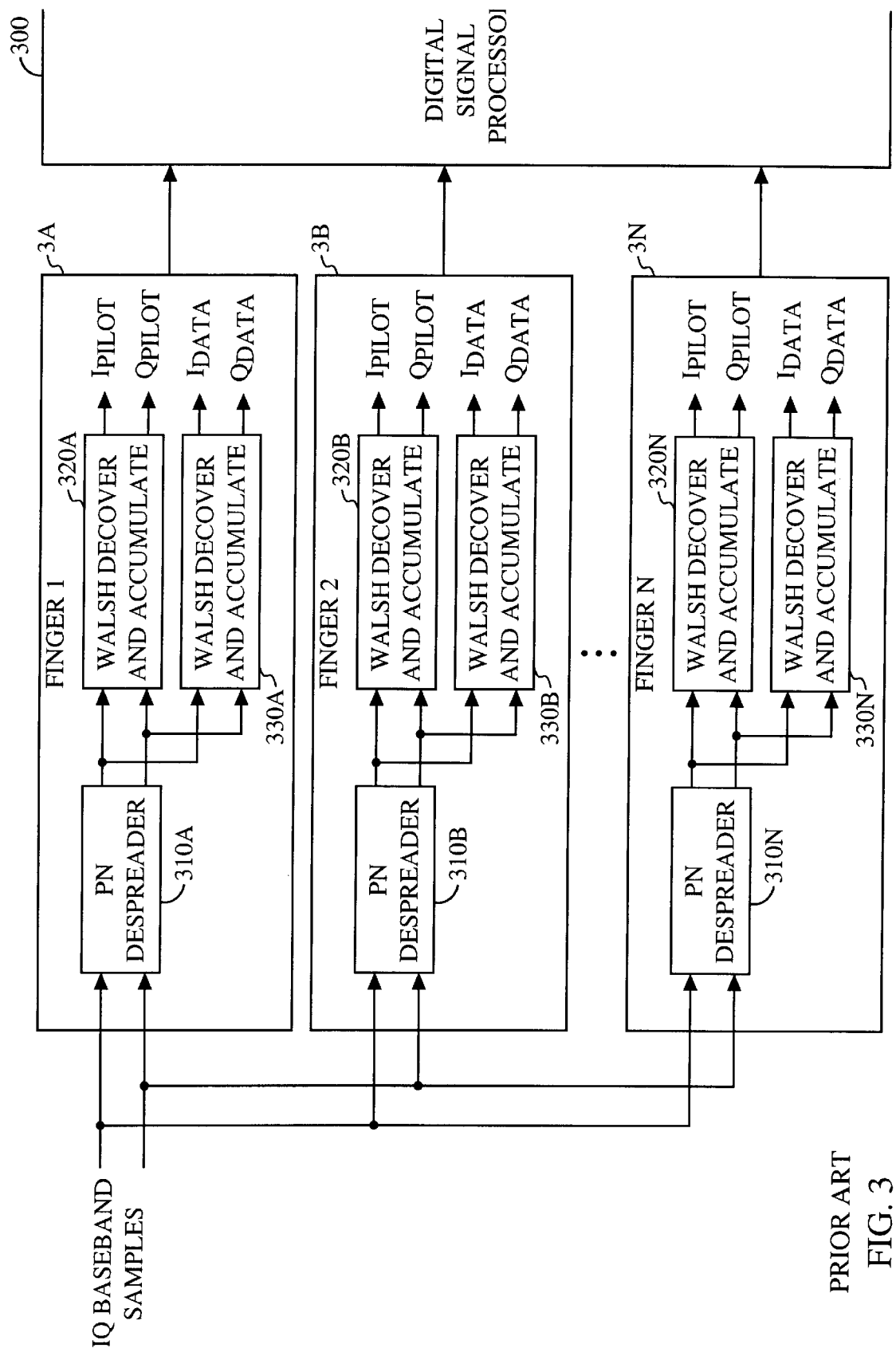
FIG. 3 is a block diagram of a prior art finger architecture of a RAKE receiver.
Figure 4:
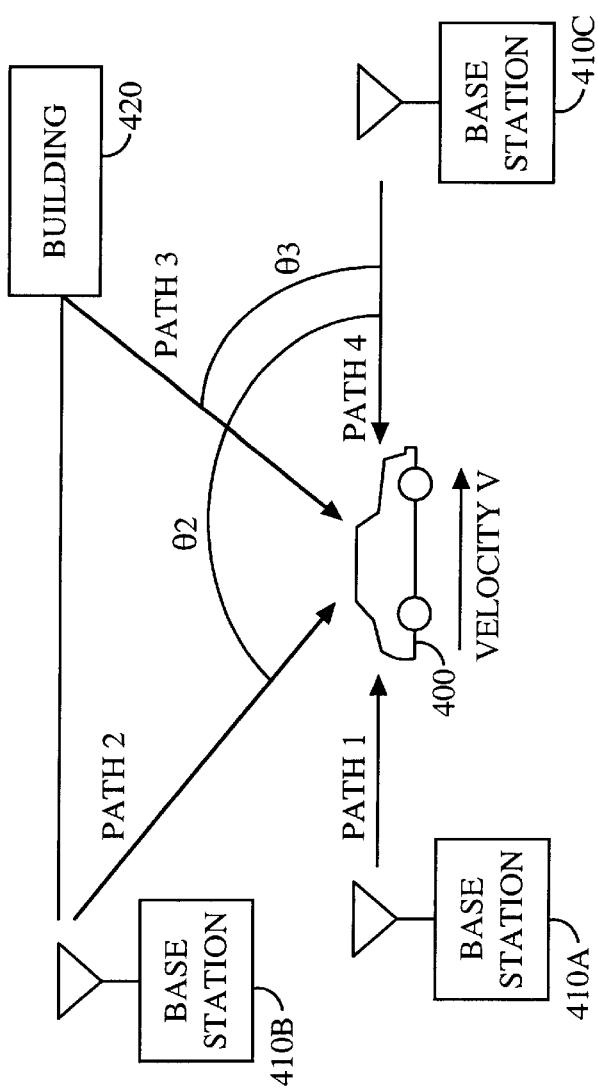
FIG. 4 depicts a subscriber unit utilizing multipath in a RAKE receiver.
Figure 5:
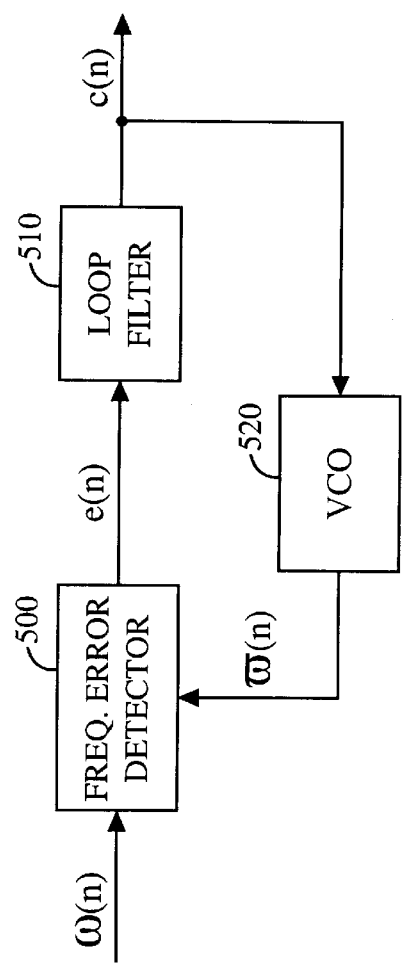
FIG. 5 is a prior art frequency locked loop.
Figure 6A:
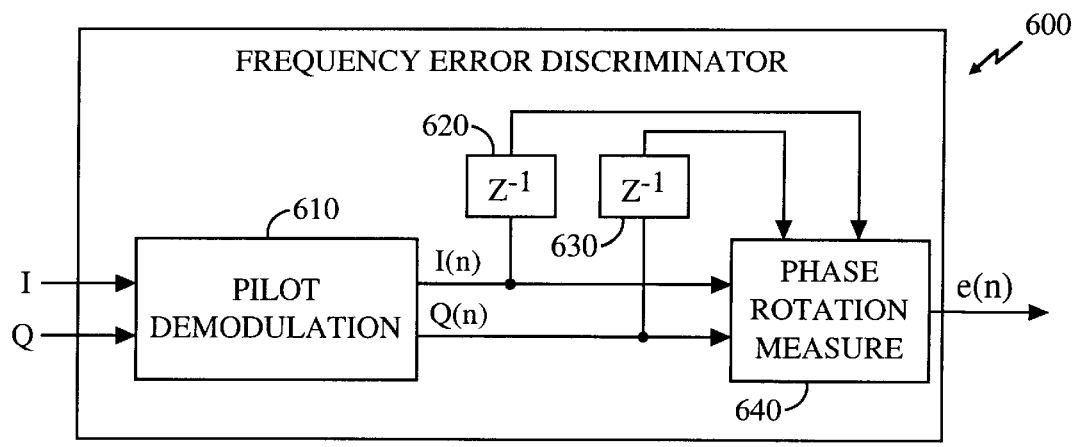
FIGS. 6A and 6B describe the frequency locked loop of FIG. 5 as applied to a CDMA system employing a RAKE receiver.
Figure 6B:
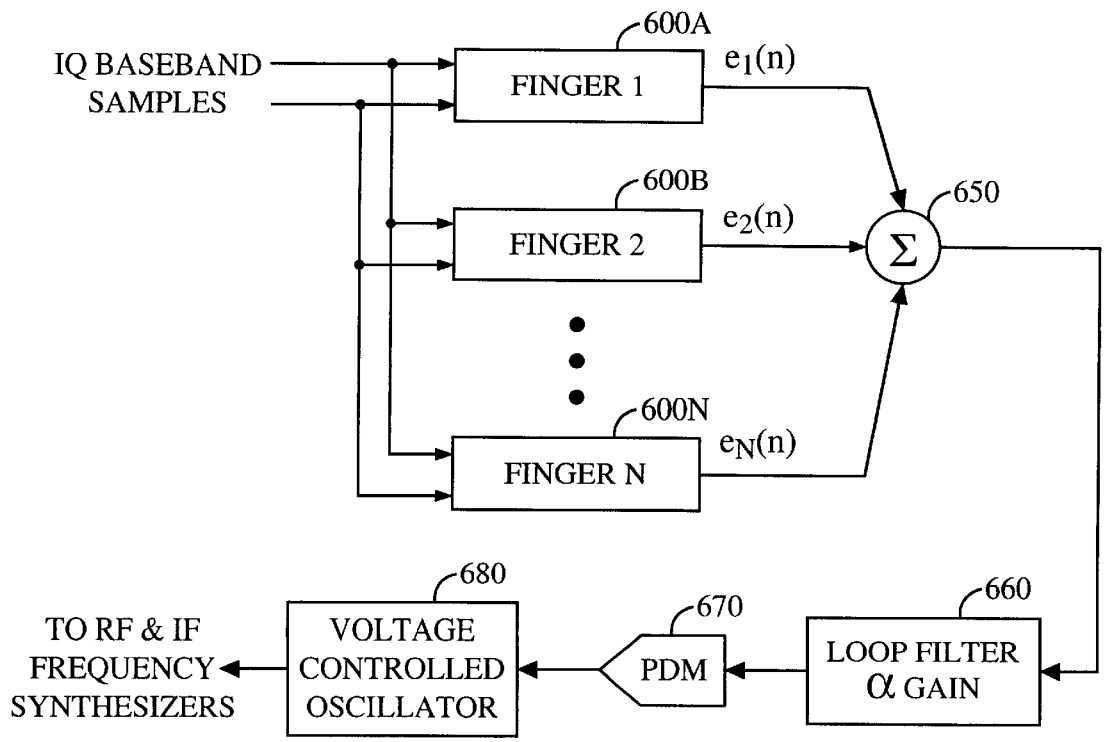
Figure 7:
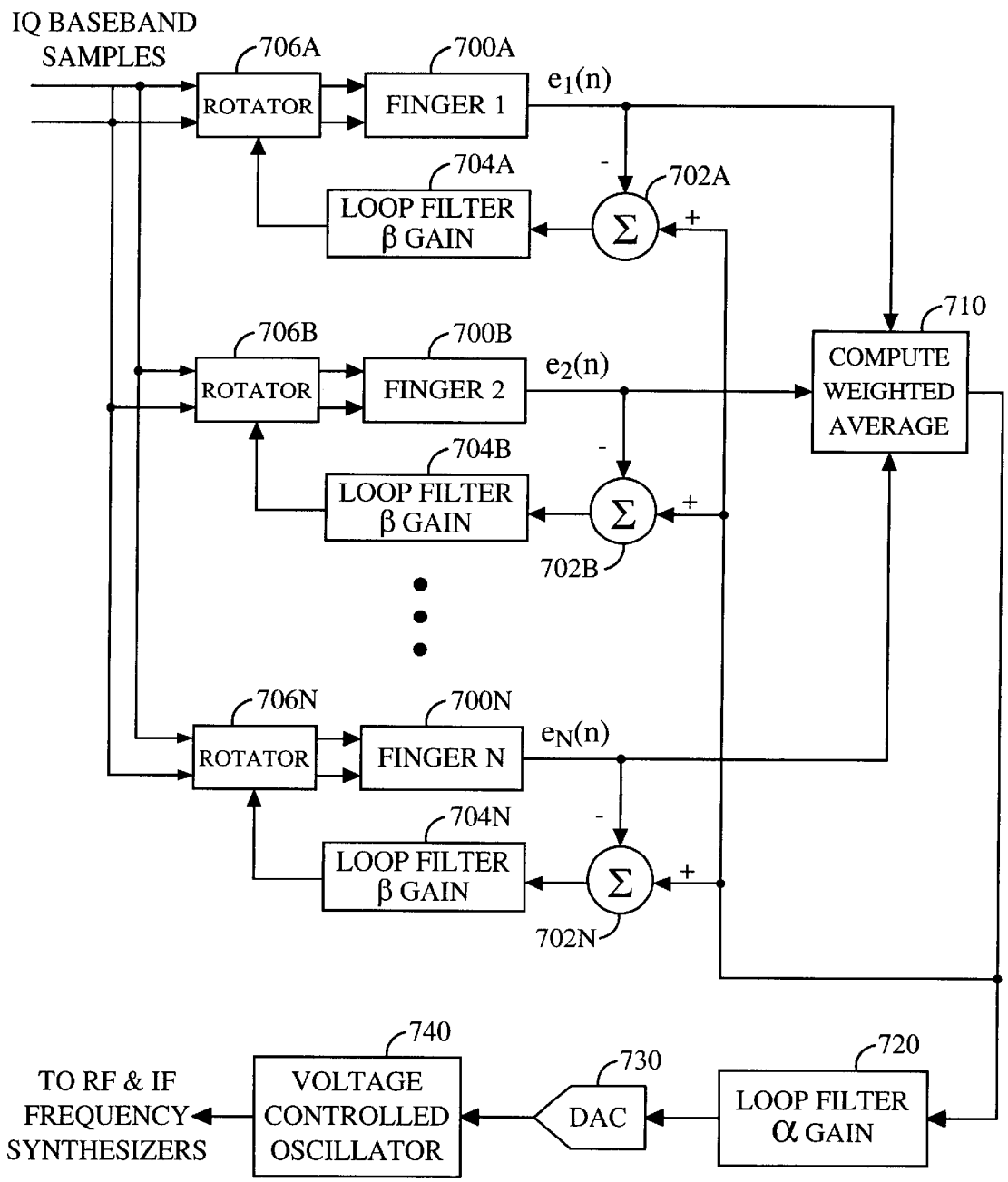
FIG. 7 depicts a frequency tracking loop configured in accordance with the present invention.

A block diagram configured in accordance with the present invention is shown in FIG. 7. I and Q baseband samples are delivered to rotators 706A–706N. The rotated I and Q samples are delivered to fingers 700A–700N, respectively. Frequency errors, $e_1(n)$–$e_N(n)$ respectively, are computed in each of fingers 700A–700N, in accordance with finger 600 in FIG. 6A, described above.

A weighted average of frequency errors $e_1(n)$–$e_N(n)$ is computed in block 710. In the exemplary implementation, the weight each finger's frequency error is in proportion to the strength of the finger's pilot, although other weightings are possible, such as a uniform weighting to each. This weighted average is passed through loop filter 720, with adjustable gain $\alpha$, and is sent via PDM 730 to voltage controlled oscillator 740, producing a frequency which has been corrected for local clock error as well as the average doppler which has been computed in block 710 (note that this is not necessarily the true average frequency error—a modification with this feature is described below). The output of voltage controlled oscillator 740 is used in the RF and IF frequency synthesizers (not shown).

To correct the balance of the error on each finger, the difference between finger frequency error and the weighted average is computed in summers 702A–702N, respectively. These differences are filtered, with adjustable gain $\beta$, in loop filters 704A–704N, the outputs of which control rotators 706A–706N, respectively, at the front of each finger 700A–700N. As is known in the art, the loop filters 704A–704N may be simply accumulators. Each rotator 706A–706N rotates the input IQ samples to correct the rest of the frequency error due to doppler. By accounting for the doppler on each individual finger, the quality of symbol demodulation when travelling at high speeds is improved.

Figure 8:
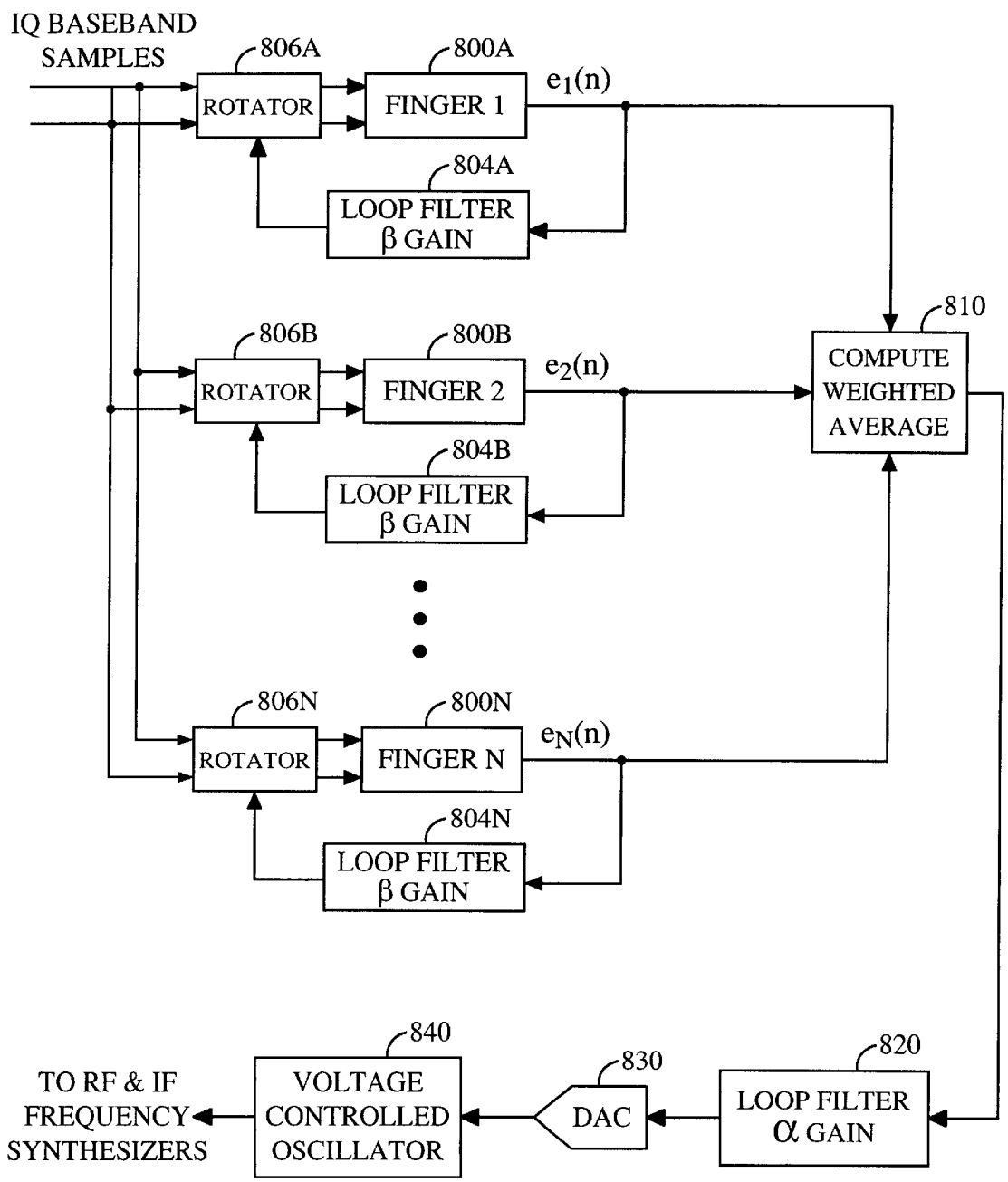
FIG. 8 depicts an alternate embodiment of a frequency tracking loop configured in accordance with the present invention.

An alternative embodiment is shown in FIG. 8. In like manner to that described in FIG. 7, I and Q baseband samples are delivered to rotators 806A–806N. The rotated I and Q samples are delivered to fingers 800A–800N, respectively. Frequency errors, $e_1(n)$–$e_N(n)$ respectively, are computed in each of fingers 800A–800N, in accordance with finger 600 in FIG. 6A, described above.

A weighted average of frequency errors $e_1(n)$–$e_N(n)$ is computed in block 810, in like manner to that described above with repect to block 710. This weighted average is passed through loop filter 820, with adjustable gain $\alpha$, and is sent via PDM 830 to voltage controlled oscillator 740, producing a frequency which has been corrected for local clock error as well as the average doppler which has been computed in block 810 (note, again, that this is not necessarily the true average frequency error—a modification with this feature is described below). The output of voltage controlled oscillator 840 is used in the RF and IF frequency synthesizers (not shown).

To correct the balance of the error on each finger, the frequency errors $e_1(n)$–$e_N(n)$ are used directly. No difference between finger frequency error and the weighted average is computed, such as was done in summers 702A–702N above. Frequency errors $e_1(n)-e_N(n)$ are filtered, with adjustable gain β, in loop filters 804A–804N, the outputs of which control rotators 806A–806N, respectively, at the front of each finger 800A–800N. Each rotator 806A–806N rotates the input IQ samples to correct the rest of the frequency error due to doppler.

In this case, there are several frequency tracking loops running simultaneously. Each finger has its own frequency tracking loop that operates using its own rotator, and there is an overall frequency tracking loop that adjusts the local clock based on a weighted average of all the finger frequency errors. To allow these loops to operate simultaneously, we adjust the loop gains α and β so that each finger's individual frequency tracking loop operates much faster than the overall tracking loop that uses the weighted average (β>α). In this way, the overall tracking loop gradually adjusts to the correct value to correct the local clock, while the individual tracking loops adjust quickly to account for the change introduced by the overall tracking loop. This implementation will converge to the same solution as the implementation shown in FIG. 7, so it provides the same benefits.

Figure 9:
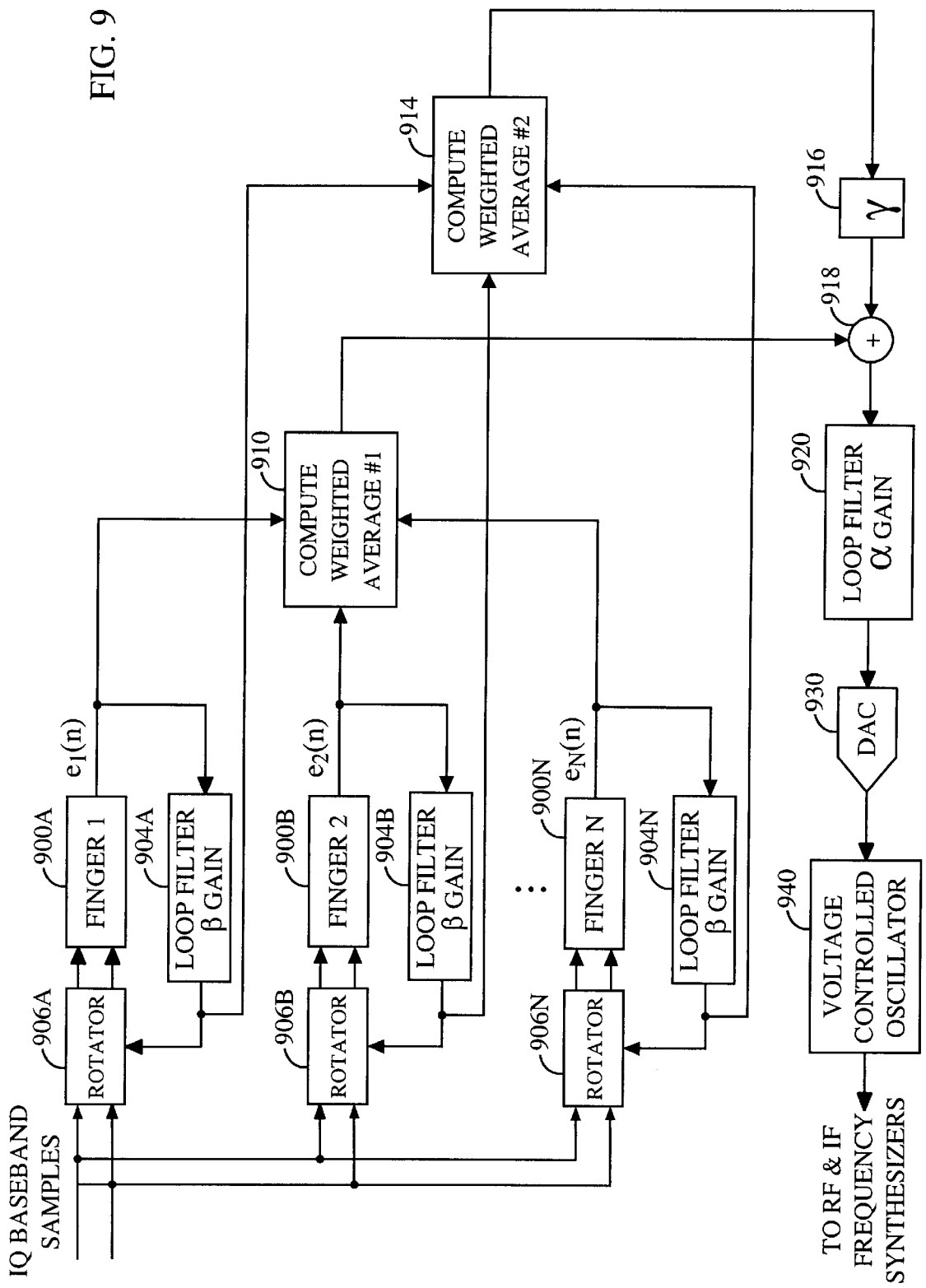
FIG. 9 is a refinement of the alternate embodiment described in reference to FIG. 8.

FIG. 9 depicts a refined embodiment of that described in reference to FIG. 8. This refinement is introduced to assure that the timing created by voltage controlled oscillator 940 is corrected for the average of frequency errors across all the fingers. This is a useful feature when the timing is used for more than demodulation in the receiver we have been describing. For example, it is common for a transmitter and receiver both to be included in a subscriber unit, and it is often advantageous for the transmitter to rely on system time as derived by the receiver.

To see why the weighted average computed in block 810 (and also block 710), described above, is not necessarily the average of the true frequency errors, consider a simple example. It is common in a RAKE receiver for a finger to be assigned a path and given a chance to track it before the results of that path are included in the overall tracking and demodulation. In this case, the frequency errors $e_1(n)-e_N(n)$ are selectively included in the computation of the weighted average in block 810. For this example, assume that initially no fingers are currently demodulating, and no frequency errors are included in the weighted average. Now a finger, 800A for example, is assigned a path to begin tracking. It is possible that loop filter 804A in conjunction with rotator 806A will drive error $e_1(n)$ to zero before it is determined to include finger 800A in the weighted average in block 810. Once $e_1(n)$ is included in the average (of only one signal in this example), the weighted average will remain zero and the RF and IF frequency synthesizers (not shown) will not be adjusted by voltage controlled oscillator 840. So it is clear that overall timing produced by voltage controlled oscillator 840 is not indicative of the average frequency error of all the fingers (the average in this example is for only finger 800A and the average error is indicated by the output of loop filter 804A).

Turn now to FIG. 9 to see the modifications which can be made to provide a timing reference which is based on the average frequency error. As before, I and Q baseband samples are delivered to rotators 906A–906N. The rotated I and Q samples are delivered to fingers 900A–900N, respectively. Frequency errors, $e_1(n)-e_N(n)$ respectively, are computed in each of fingers 900A–900N, in accordance with finger 600 in FIG. 6A, described above. Frequency errors $e_1(n)-e_N(n)$ are filtered, with adjustable gain β, in loop filters 904A–904N, the outputs of which control rotators 906A–906N, respectively, at the front of each finger 900A–900N. Each rotator 906A–906N rotates the input IQ samples to correct the finger specific frequency error due to doppler. The components of FIG. 9 described thus far have not changed from their counterparts in FIG. 8.

As above, a first weighted average of frequency errors $e_1(n)-e_N(n)$ is computed in block 910. However, this embodiment also includes a second weighted average, computed in block 914, which averages the filtered versions of $e_1(n)-e_N(n)$ produced in loop filters 904A–904N, respectively. The method for computing each weighted average can be the same as those described above. The second weighted average, computed in block 914, is modified by adjustable gain y in block 916. This result is added in summer 918 to the first weighted average, computed in block 910.

The remainder of FIG. 9 is similar to FIG. 8. The sum from summer 918 is passed through loop filter 920, with adjustable gain α, and is sent via PDM 930 to voltage controlled oscillator 940, producing a frequency which has been corrected for the true average frequency error across all the fingers. The output of voltage controlled oscillator 940 is used in the RF and IF frequency synthesizers (not shown).

Owing to the additional connections just described, the design of FIG. 9 will always ensure that the voltage controlled oscillator settles at the average of the doppler errors from all fingers—not always the case with the previous two implementations as demonstrated in the previous example. In the previous example, before a finger was included, it was likely that its frequency error was already driven to zero by its rotator and loop filter. When finally added to the system described in FIG. 8, that implementation did not ensure that the voltage controlled oscillator moved to a value equal to the average frequency error based on all fingers. In the embodiment depicted in FIG. 9, on the other hand, the new connections from the outputs of loop filters 904A–904N are non-zero and so will contribute to the averaging process. As a result, eventually voltage controlled oscillator 940 will move to its intended value of the average frequency of all N fingers.

Thus, a method and apparatus for frequency tracking has been described. The description is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A RAKE receiver comprising:
   a plurality of fingers for receiving a signal, each finger comprising:
   a frequency error calculator for computing a frequency error and
   a timing adjustor for adjusting the timing of said received signal in response to said frequency error for use in said finger;
   a weighted average calculator for computing a weighted average of said plurality of frequency errors, wherein the weight of each finger's frequency error is calculated in proportion to a strength of each finger's pilot; and a timing adjustor for adjusting the timing of said received signals in response to said weighted average for use in said plurality of fingers.

2. A RAKE receiver comprising:

a timing source;

a plurality of finger timing adjustors for receiving signals and adjusting their timing in response to a plurality of adjustment signals to produce adjusted finger signals;

a plurality of fingers for receiving said adjusted finger signals and calculating a plurality of frequency errors in relation to said timing source;

a means for calculating a weighted average of said plurality of frequency errors;

a timing adjustor for adjusting the timing of said timing source in response to said weighted average; and a plurality of summers for subtracting each of said plurality of frequency errors from said weighted average to produce a plurality of differences for connecting to said plurality of adjustment signals of said finger timing adjustors.

3. The RAKE receiver of claim 2 wherein each of said finger timing adjustors comprises:

a loop filter for receiving one of said adjustment signals and producing a filtered adjustment signal and a rotator for receiving said signals and rotating them in response to said filtered adjustment signal to produce said adjusted finger signals.

4. The RAKE of claim 3 wherein each of said fingers comprises:

a pilot demodulator and a phase rotation measurer.

5. The RAKE receiver of claim 4 wherein said timing adjustor comprises:

a loop filter;

a pulse density modulator; and a voltage controlled oscillator.

6. A RAKE receiver comprising:

a timing source;

a plurality of finger timing adjustors for receiving signals and adjusting their timing in response to a plurality of adjustment signals to produce adjusted finger signals;

a plurality of fingers for receiving said adjusted finger signals and calculating a plurality of frequency errors in relation to said timing source and wherein said frequency errors are connected to said plurality of adjustment signals of said finger timing adjustors;

a means for calculating a weighted average of said plurality of frequency errors; and a timing adjustor for adjusting the timing of said timing source in response to said weighted average.

7. The RAKE receiver of claim 6 wherein each of said finger timing adjustors comprises:

a loop filter for receiving one of said adjustment signals and producing a filtered adjustment signal and a rotator for receiving said signals and rotating them in response to said filtered adjustment signal to produce said adjusted finger signals.

8. The RAKE receiver of claim 7 wherein each of said fingers comprises:

a pilot demodulator and a phase rotation measurer.

9. The RAKE receiver of claim 8 wherein said timing adjustor comprises:

a loop filter;

a pulse density modulator; and a voltage controlled oscillator.

10. A RAKE receiver comprising:

a timing source;

a plurality of finger timing adjustors for receiving signals and adjusting their timing in response to a plurality of adjustment signals to produce adjusted finger signals;

a plurality of fingers for receiving said adjusted finger signals and calculating a plurality of frequency errors in relation to said timing source;

a plurality of loop filters for filtering said frequency errors and for connecting said plurality of filtered frequency errors to said plurality of said finger timing adjustors as said plurality of adjustment signals;

a means for calculating a first weighted average of said plurality of frequency errors;

a means for calculating a second weighted average of said plurality of filtered frequency errors;

a means for combining said first and second weighted averages to produce a timing adjustor signal;

a timing adjustor for adjusting the timing of said timing source in response to said timing adjustor signal.

11. The RAKE receiver of claim 10 wherein each of said finger timing adjustors comprises a rotator for receiving said signals and rotating them in response to said filtered frequency errors to produce said adjusted finger signals.

12. The RAKE receiver of claim 11 wherein each of said fingers comprises:

a pilot demodulator and a phase rotation measurer.

13. The RAKE receiver of claim 12 wherein said timing adjustor comprises:

a loop filter;

a pulse density modulator; and a voltage controlled oscillator.

14. The RAKE receiver of claim 11 wherein said means for combining said first and second weighted averages comprises:

an adjustable gain block for multiplying said second weighted average by and adjustable gain to produce a gain adjusted weighted average and an adder for summing said first weighted average and said gain adjusted weighted average to produce said timing adjustor signal.

15. A method for frequency tracking in a RAKE receiver comprising the steps of:

a) calculating a plurality of frequency of errors;

b) adjusting timing for each of a plurality of fingers in response to ones of said plurality of frequency errors;

c) computing a weighted average of said plurality of frequency errors, wherein the weight of each finger's frequency error is in proportion to a strength of each finger's pilot; and d) adjusting timing for the plurality of fingers in response to said weighted average.

16. A method for frequency tracking in a RAKE receiver comprising the steps of:

a) calculating a plurality of frequency errors;

b) filtering said plurality of frequency of errors to produce a plurality of filtered frequency errors;

e) adjusting timing for each of a plurality of fingers in response to ones of said plurality of filtered frequency errors;

f) computing a weighted average of said plurality of frequency errors; and g) adjusting timing for the plurality of fingers in response to said weighted average.

17. The method of claim 16 further comprising the step of filtering said weighted average prior to adjusting said timing for the plurality of fingers.

18. A method for frequency tracking in a RAKE receiver comprising the steps of:

a) calculating a plurality of frequency errors;

b) filtering said plurality of frequency of errors to produce a plurality of filtered frequency errors;

c) adjusting timing for each of a plurality of fingers in response to ones of said plurality of filtered frequency errors;

d) computing a first weighted average of said plurality of frequency errors;

e) computing a second weighted average of said plurality of filtered frequency errors;

f) summing said first and second weighted averages; and g) adjusting timing for the plurality of fingers in response to said weighted average.

19. The method of claim 18 further comprising the step of multiplying said second weighted average by a gain factor prior to said summing of said first and second weighted averages.

20. The method of claim 19 further comprising the step of filtering said sum of weighted averages prior to adjusting said timing for the plurality of fingers.

21. A method for frequency tracking in a RAKE receiver comprising the steps of:

a) calculating a plurality of frequency errors;

b) computing a weighted average of said plurality of frequency errors;

c) adjusting timing for the plurality of fingers in response to said weighted average;

d) subtracting each of said plurality of frequency errors from said weighted average to produce a plurality of differences;

e) filtering said plurality of differences to produce a plurality of filtered differences;

f) adjusting timing for each of a plurality of fingers in response to ones of said plurality of filtered differences.

22. The method of claim 21 further comprising the step of filtering said weighted average prior to adjusting said timing for the plurality of fingers.

* * * * *